(12) United States Patent
Nagarathinam et al.

(10) Patent No.: US 10,444,712 B2
(45) Date of Patent: Oct. 15, 2019

(54) METHOD AND SYSTEM TO OPTIMIZE ENERGY CONSUMPTION IN A ZONE WITH A MULTI-AIR HANDLING UNIT (AHU) SETUP

(71) Applicant: Tata Consultancy Services Limited, Mumbai (IN)

(72) Inventors: Srinarayana Nagarathinam, Chennai (IN); Shiva R Iyer, Chennai (IN); Venkata Ramakrishna P, Chennai (IN); Arunchandar Vasan, Chennai (IN); Venkatesh Sarangan, Chennai (IN); Anand Sivasubramaniam, Chennai (IN)

(73) Assignee: Tata Consultancy Services Limited, Mumbai (IN)

(*) Notice: Subject to any disclaimer, the term of this patent is extended or adjusted under 35 U.S.C. 154(b) by 261 days.

(21) Appl. No.: 15/208,022

(22) Filed: Jul. 12, 2016

(65) Prior Publication Data

US 2017/0016644 A1    Jan. 19, 2017

(30) Foreign Application Priority Data

Jul. 13, 2015    (IN) .......................... 2637/MUM/2015

(51) Int. Cl.
*G05B 13/04* (2006.01)
*G05B 19/042* (2006.01)
(Continued)

(52) U.S. Cl.
CPC .............. *G05B 13/04* (2013.01); *F24F 11/30* (2018.01); *F24F 11/62* (2018.01); *G05B 15/02* (2013.01); *G05B 19/0428* (2013.01); *F24F 11/46* (2018.01); *F24F 11/54* (2018.01); *F24F 11/64* (2018.01); *F24F 2110/10* (2018.01); *F24F 2110/20* (2018.01); *F24F 2110/64* (2018.01);
(Continued)

(58) Field of Classification Search
CPC ........................... G05B 11/01; G05B 19/0428
See application file for complete search history.

(56) References Cited

U.S. PATENT DOCUMENTS 6,986,708 B2    1/2006  Demster
8,364,318 B2    1/2013  Grabinger et al.
(Continued)

*Primary Examiner* — Robert E Fennema
*Assistant Examiner* — Santosh R Poudel
(74) *Attorney, Agent, or Firm* — Finnegan, Henderson, Farabow, Garrett & Dunner LLP

(57) ABSTRACT

A system and method for optimizing energy consumption in a plurality of air handling units (AHUs) in a zone is provided. The system comprising a zone thermal unit that is configured to obtain a first set of input parameters including an internal heat gains, a surface convective loads, an intra-zone mixing, a supply air temperature, a second set of input parameters including internal moisture gains, a supply humidity ratio, and a third set of input parameters including an air contaminant concentration and an ambient contaminant concentration of the AHUs and generates a first set of output parameters including a zone temperature, a humidity ratio and an air concentration. The system further includes an optimizer that is configured to generate a second set of output parameters including an optimum combination of AHU flow rates for the AHUs based on at least one of the first set of output parameters.

20 Claims, 2 Drawing Sheets

(51) Int. Cl.

| | | |
|---|---|---|
| *F24F 11/30* | (2018.01) | |
| *F24F 11/62* | (2018.01) | |
| *G05B 15/02* | (2006.01) | |
| *F24F 110/10* | (2018.01) | |
| *F24F 110/20* | (2018.01) | |
| *F24F 110/64* | (2018.01) | |
| *F24F 120/10* | (2018.01) | |
| *F24F 140/50* | (2018.01) | |
| *F24F 130/30* | (2018.01) | |
| *F24F 11/64* | (2018.01) | |
| *F24F 11/54* | (2018.01) | |
| *F24F 11/46* | (2018.01) | |

(52) U.S. Cl.
CPC ....... *F24F 2120/10* (2018.01); *F24F 2130/30* (2018.01); *F24F 2140/50* (2018.01)

(56) References Cited

U.S. PATENT DOCUMENTS

| | | | | |
|---|---|---|---|---|
| 2008/0277486 A1* | 11/2008 | Seem | ............ | H04L 67/125 236/49.3 |
| 2009/0171512 A1* | 7/2009 | Duncan | ............ | F24F 5/0035 700/300 |
| 2010/0076607 A1* | 3/2010 | Ahmed | ............ | G06F 1/206 700/276 |
| 2010/0105308 A1* | 4/2010 | Masse | ............ | E21F 1/00 454/168 |
| 2010/0163633 A1 | 7/2010 | Barrett et al. | | |
| 2011/0066258 A1* | 3/2011 | Torzhkov | ............ | G05B 13/042 700/29 |
| 2012/0215511 A1* | 8/2012 | Sarma | ............ | G01V 1/308 703/10 |
| 2012/0296480 A1* | 11/2012 | Raman | ............ | G05B 13/026 700/277 |
| 2014/0039686 A1* | 2/2014 | Corbin | ............ | G05D 23/1923 700/276 |
| 2015/0032264 A1* | 1/2015 | Emmons | ............ | F24F 11/0001 700/276 |
| 2015/0082826 A1* | 3/2015 | Santini | ............ | F24F 13/20 62/426 |
| 2015/0253027 A1* | 9/2015 | Lu | ............ | F24F 11/006 700/276 |
| 2015/0253030 A1* | 9/2015 | Holub | ............ | G06Q 50/06 700/276 |
| 2016/0313751 A1* | 10/2016 | Risbeck | ............ | G05D 23/1917 |
| 2016/0342957 A1* | 11/2016 | Sloup | ............ | G06Q 10/20 |
| 2017/0176032 A1* | 6/2017 | Wang | ............ | F24F 11/30 |

* cited by examiner

METHOD AND SYSTEM TO OPTIMIZE ENERGY CONSUMPTION IN A ZONE WITH A MULTI-AIR HANDLING UNIT (AHU) SETUP

PRIORITY CLAIM

This application claims priority under 35 U.S.C. § 119 from India Application No. 2637/MUM/2015, filed on Jul. 13, 2015. The entire contents of the aforementioned application are incorporated herein by reference.

TECHNICAL FIELD

The embodiments herein generally relate to energy consumption and optimization systems, and, more particularly, energy consumption and optimization systems involving a zone with multiple air handling units.

BACKGROUND

Buildings with large spaces served by multiple AHUs are common. Conventional control based AHU systems optimize on return air temperature alone and no occupancy information is used. In many buildings, the occupancy is spatially skewed and hence, there is scope to optimize the HVAC energy by operating on the AHU ensemble together. Independent AHU control based on return air temperature is sub-optimal. It is significant to note that heating, ventilation and air conditioning (HVAC) accounts for more than 40% of the total energy consumption in most building types.

Understanding when and where people are present inside a building can help to control the HVAC systems in a better way. There have been works on occupancy based controls that exploit occupancy information for managing IT assets/HVAC energy. These works have typically focused on using occupancy information for purposes such as: on-demand desktop management, lighting control, adjusting fresh air intake, and varying set-point temperatures as per the estimated/observed occupancy.

Occupancy information is obtained through direct sensing, indirect sensing or through using prediction models. Even though, spatial occupancy information sensed at different resolutions are useful in optimizing energy consumption in an area with multi air handling unit setup, conventional PID controllers cannot utilize this information effectively.

SUMMARY

The following presents a simplified summary of some embodiments of the disclosure in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

In one aspect, a system for optimizing energy consumption in a zone multi-AHU setup is provided. The system comprising a zone thermal unit that is configured to obtain a first set of input parameters specific to a plurality of air handling units (AHUs) in a zone. The first set of input parameters comprises at least one of an internal heat gains, a surface convective loads, an intra-zone mixing, a supply air temperature, The zone thermal unit is further configured to obtain a second set of input parameters comprising internal moisture gains, a supply humidity ratio of the plurality of air handling units. The zone thermal unit is further configured to obtain a third set of input parameters specific to the plurality of air handling units (AHUs) comprising an air contaminant concentration and an ambient contaminant concentration of the plurality of air handling units. Furthermore, the system generates a first set of output parameters comprising a zone temperature, a humidity ratio and an air concentration at a first time interval based on the at least one of the first set of input parameters, the second set of input parameters, and the third set of input parameters. The system further comprises an optimizer that is configured to generate a second set of output parameters comprising an optimum combination of AHU flow rates for the plurality of air handling units based on at least one of the first set of output parameters and a set of parameters, wherein the set of parameters comprises AHU supply fan and chiller performance curves.

The optimum combination of AHU flow rates for the plurality of air handling units is indicative of a vector of AHU supply mass flow rate. The zone thermal unit comprises a zone temperature unit that receives the first set of input parameters to generate the zone temperature. The zone thermal unit further comprises a zone humidity unit that receives the second set of input parameters to generate the humidity ratio. The zone thermal unit comprises a zone concentration unit that receives the third set of input parameters to generate the air contaminant concentration.

The second set of input parameters comprises at least one parameter from the first set of input parameters. The third set of input parameters comprises the at least one parameter from the first set of input parameters. Then at least one parameter from the first set of input parameters is an intra-zone mixing. Furthermore, each of the plurality of AHUs comprises an AHU controller that is configured using at least one of the optimum combination of AHU flow rates by at least one of the system and a building energy management system. The optimum combination of AHU flow rates comprises at least one of an optimal supply air mass flow rate and an optimal supply air temperature. The internal heat gains comprise at least one of an occupancy, lighting and electrical loads in the zone. Surface convective loads comprise at least one of a surface temperature and a geometric area of surfaces associated with the zone. The intra-zone mixing comprises at least one of temperature and humidity in a plurality of sub-zones in the zone. The internal moisture gains comprises occupancy information in the zone.

In another aspect, a method for optimizing an energy consumption of a area with multiple air handling units is provided. The method comprising obtaining using a zone thermal unit, a first set of input parameters specific to a plurality of air handling units (AHUs) in a zone, the first set of input parameters comprising at least one of an internal heat gains, a surface convective loads, an intra-zone mixing, a supply air temperature; obtaining a second set of input parameters comprising internal moisture gains, a supply humidity ratio of the plurality of air handling units; obtaining using the zone thermal unit, a third set of input parameters specific to the plurality of air handling units (AHUs) in the zone, the third set of input parameters comprising an air contaminant concentration and an ambient contaminant concentration of said plurality of air handling units; generating a first set of output parameters comprising a zone temperature, a humidity ratio and an air concentration at a first time interval, and generating, using an optimizer, a second set of output parameters comprising an optimum combination of AHU flow rates for the plurality of air handling units based on at least one of the first set of output parameters and a set of parameters, wherein the set of parameters comprises AHU supply fan and chiller performance curves.

The optimum combination of AHU flow rates for the plurality of air handling units is indicative of a vector of AHU supply mass flow rate. The zone thermal unit comprises a zone temperature unit that receives the first set of input parameters to generate the zone temperature. The zone thermal unit further comprises a zone humidity unit that receives the second set of input parameters to generate the humidity ratio. The zone thermal unit comprises a zone concentration unit that receives the third set of input parameters to generate the air contaminant concentration.

The second set of input parameters comprises at least one parameter from the first set of input parameters. The third set of input parameters comprises the at least one parameter from the first set of input parameters. The at least one parameter from the first set of input parameters is an intra-zone mixing. Furthermore, each of the plurality of AHUs comprises an AHU controller that is configured using at least one of the optimum combination of AHU flow rates by at least one of the system and a building energy management system. The optimum combination of AHU flow rates comprises at least one of an optimal supply air mass flow rate and an optimal supply air temperature. The internal heat gains comprise at least one of an occupancy, lighting and electrical loads in the zone. Surface convective loads comprise at least one of a surface temperature and a geometric area of surfaces associated with the zone. The intra-zone mixing comprises at least one of temperature and humidity in a plurality of sub-zones in the zone. The internal moisture gains comprises occupancy information in the zone

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Figure 1:
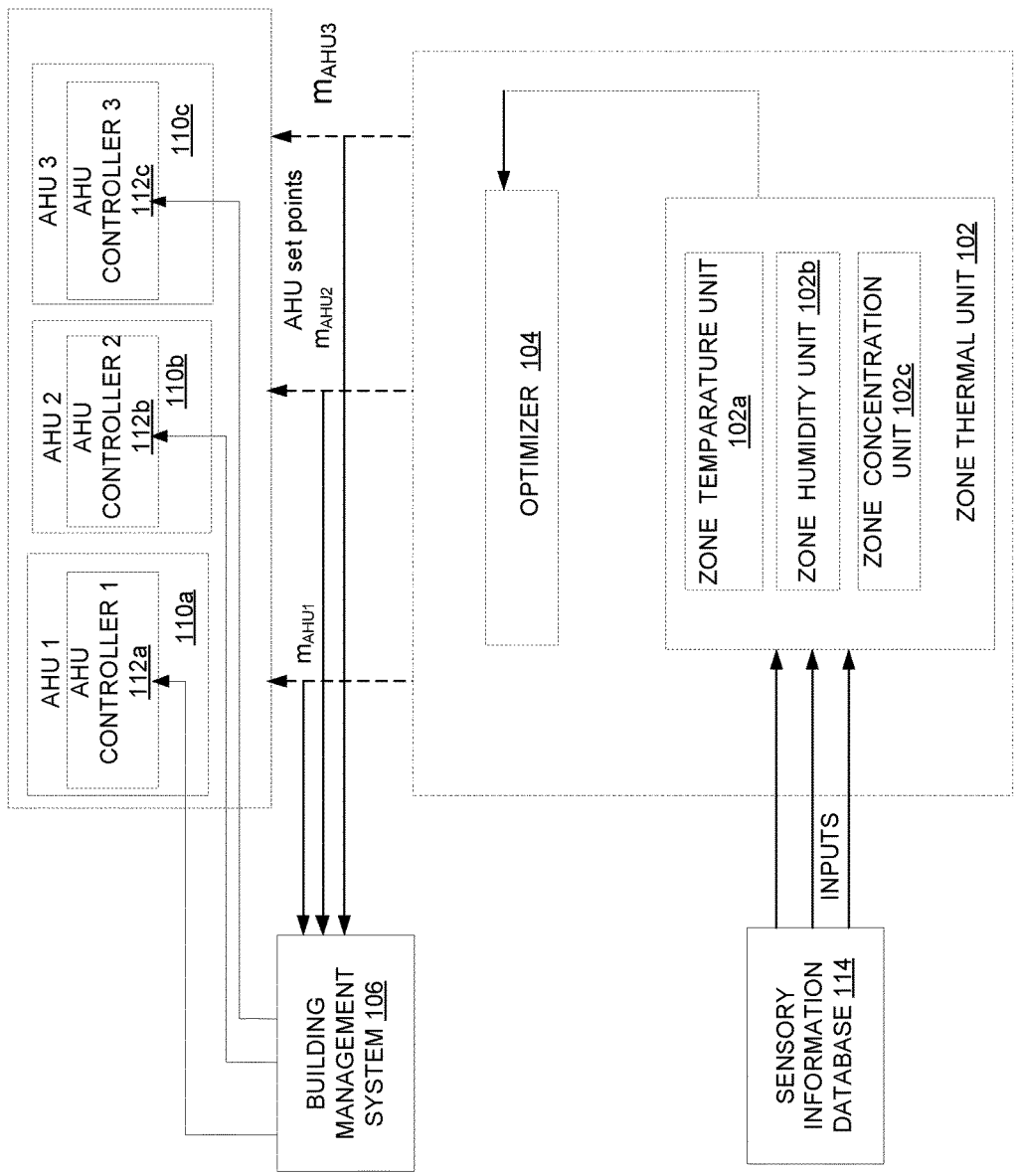
FIG. 1 illustrates a block diagram of a system which optimizes the energy consumption of an area with multiple air handling units, according to an embodiment of the present disclosure.
Figure 2:
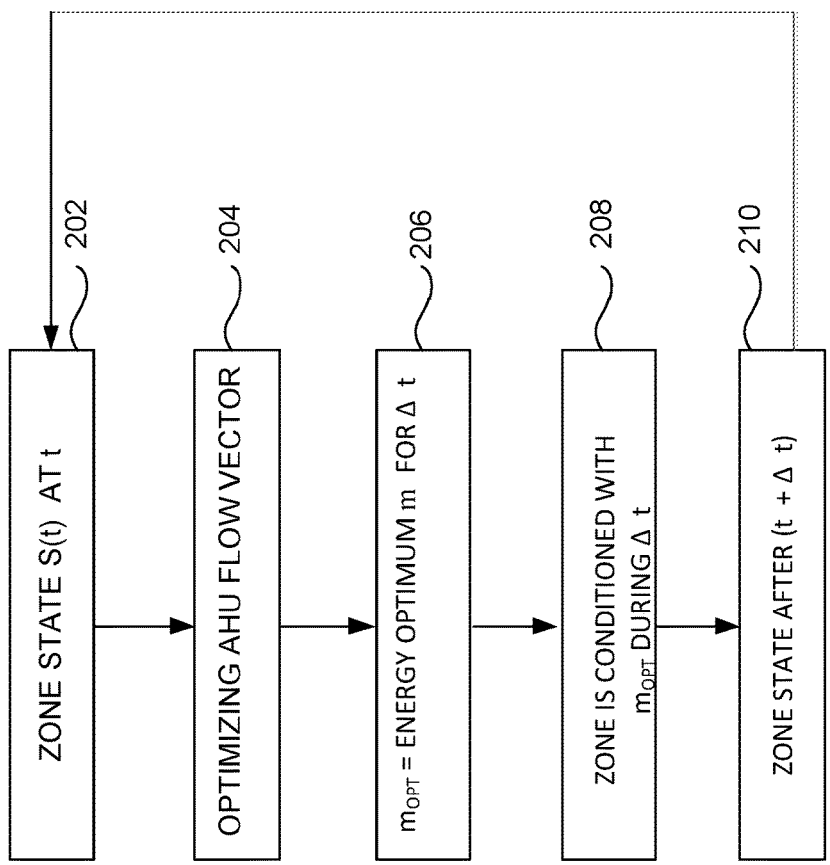
FIG. 2 is a flow diagram illustrating a method of optimization of the two or more air handling units of FIG. 1 using an optimizer, according to an embodiment of the present disclosure.

Referring now to the drawings, and more particularly to FIGS. 1 through 2, where similar reference characters denote corresponding features consistently throughout the figures, there are shown preferred embodiments and these embodiments are described in the context of the following exemplary system and/or method.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

FIG. 1 illustrates a schematic diagram of a system 100 to optimize the energy consumption of an area with two or more air handling units 110$a$-110$c$, according to an embodiment of the present disclosure. The system 100 comprises a zone thermal unit 102, and an optimizer 104. The zone thermal unit 102 comprises a zone temperature unit 102$a$, a zone humidity unit 102$b$, and a zone concentration unit 102$c$.

The zone thermal unit 102 obtains a first set of input parameters specific to the two or more air handling units (AHUs) 110$a$-110$c$ in a zone(s) (or an area(s)). The first set of input parameters comprises at least one of an internal heat gains, a surface convective loads, an intra-zone mixing, a supply air temperature. The internal heat gains comprise at least one of an occupancy, lighting and electrical loads in the zone and so on, in one example embodiment. The surface convective loads comprise at least one of a surface temperature, a geometric area of surfaces associated with the zone, and so on, in one example embodiment. Similarly, the intra-zone mixing comprises at least one of temperature, humidity in a plurality of sub-zones in the zone. The zone thermal unit 102 is further configured to obtain a second set of input parameters comprising internal moisture gains, a supply humidity ratio of the two or more air handling units 110$a$-110$c$. The zone thermal unit 102 is further configured to obtain a third set of input parameters specific to the plurality of air handling units (AHUs) comprising an air contaminant concentration and an ambient contaminant concentration of the two or more air handling units 110$a$-110$c$. The two or more air handling units 110$a$-110$c$ may also be referred herein as a multi air handling unit set up or a plurality of air handling units.

The zone thermal unit 102 generates a first set of output parameters comprising a zone temperature, a humidity ratio and an air concentration at a first time interval based on the at least one of the first set of input parameters, the second set of input parameters, and the third set of input parameters. In particular, the zone temperature unit 102$a$ obtains the first set of input parameters comprising at least one of an internal heat gains, a surface convective loads, an intra-zone mixing, a supply air temperature specific to the two or more air handling units (AHUs) 110a-110c in a zone and generates the zone temperature. Similarly, the zone humidity unit 102b receives (or obtains) the second set of input parameters comprising internal moisture gains, a supply humidity ratio of the two or more air handling units 110a-110c and generates the humidity ratio. Similarly, the zone concentration unit 102c obtains the third set of input parameters comprising the air contaminant concentration and the ambient contaminant concentration specific to (or from) the two or more air handling units 110a-110c and generates an air concentration. The optimizer 104 that is configured to generate a second set of output parameters comprising an optimum combination of AHU flow rates for the plurality of air handling units 110a-110c based on at least one of the first set of output parameters and a set of parameters, wherein the set of parameters comprises AHU supply fan and chiller performance curves.

The optimizer 104 searches for combination of AHU fan flow rate settings, for example, $m_x$, that ensures zone state at time (t+Δt), S(t+Δt) is within the specified constraints while minimizing the HVAC energy (E-HVAC). S(t) denotes the state of the super-zone at time t including the temperatures and humidity of all zones z; and M denote the mass flow rates of the n AHU's serving the super-zone, where n is a natural number range from 1, 2, and so on. The optimizer 104 is configured to directly set the AHU fan speeds. The AHU fan speeds are collectively optimized to minimize the overall HVAC energy consumption without violating the comfort requirements.

Each of the plurality of air handling units (AHUs) 110a-110c comprises corresponding an AHU controller. For example, as depicted in FIG. 1, a first AHU 110a comprises a first AHU controller 112a, a second AHU 110b comprises a second AHU controller 112b, and a third AHU comprises a third AHU controller 112c respectively. Each of the AHU controller 112a-112c them is configured with optimum combination of AHU flow rates by at least one of the optimizer 104 and a building energy management system 106. The optimum combination of AHU flow rates comprises at least one of an optimal supply air mass flow rate and an optimal supply air temperature. The first set of input parameters, the second set of input parameters, and the third set of input parameters are obtained from one or more sensors. First set of input parameters are obtained from one or more sensors comprising power meters, swipe meters, Infra-red heat sensors and temperature sensors. Second set of input parameters are obtained from one or more sensors comprising swipe meters and supply air humidity sensor. Third set of input parameters are obtained from one sensor comprising CO2 sensor and zone concentrations sensor. These one or more sensors are placed in either one or more sub-zones of the zone (or in proximity of the zone or the one or more sub-zones of the zone). The first set of input parameters, the second set of input parameters, and the third set of input parameters individually, collectively, or in combination is referred as sensory information database 114, in one example embodiment. Inputs from the sensory information database 114 are provided to zone thermal unit 102.

This sensory information is obtained in real-time, or near real-time to optimize the energy consumption by the air handling units 110a-110c by configuring one or more settings of the AHU controllers 112a-c based on an output generated by the optimizer 104 as described above.

In one embodiment, a building management system 106 receives one or more AHU flow rates from the optimizer 104, where the building management system 106 sets (or configures) each of the AHU controllers 112a, 112b, 112c with respective mass flow rates $m_{AHU1}, m_{AHU2}, m_{AHU3}$. For example, $m_{AHU1}, m_{AHU2}, m_{AHU3}$ are AHU set points for corresponding AHU controllers 112a, 112b, 112c. In some implementations, where the building management system 106 is not present, the optimizer 104 is configured to directly set the mass flow rates $m_{AHU1}, m_{AHU2}, m_{AHU3}$ of corresponding AHU controllers 112a, 112b, 112c. The optimizer 104 or the building management system 106 configures at least one of the one or more AHU controllers 112a-112c through one or more available connections, for example, but are not limited to, wired setup, a wireless setup, a local area network, a wide area network, NFC, a remote network, and so on.

FIG. 2, with reference to FIG. 1, is a flow diagram illustrating a method of optimization of the two or more air handling units of FIG. 1 using an optimizer, according to the embodiments as disclosed herein. In step 202, the optimizer 104 takes the zone state S(t) as an input. In step 204, the optimizer 104 searches through the possible fan flow settings $m_x$ that can result (or results) in required thermal and indoor air quality conditions in the super-zone at the next time instant (t+Δt), assuming that no external disturbances occur from t to (t+Δt). For each AHU flow vector $m_x$, the optimizer 104 uses a zone thermal, humidity and contaminant concentration models (or parameters as described above) to estimate the zone conditions $S(t+\Delta t)_x$ that results due to $m_x$. The optimizer 104 also estimates the corresponding HVAC energy consumption $E_{HVAC,x}$. The optimizer 104 further determines the AHU flow vector that yields required thermal and indoor air quality conditions in the super-zone, while consuming the least $E_{HVAC}$. In step 206, the optimum flow vector $m_{opt}$ as determined by the optimizer 104 is used for configuring each of the AHU controllers 112a-112c during the forthcoming time-interval Δt; and the process is repeated for the subsequent Δt's. In step 208, the zone is conditioned with the mass flow rate $m_{Opt}$ obtained during earlier step 206. In step 210, the state of the zone at time instant (t+Δt) is displayed. As described above, either the optimizer 104 can configure the AHU controllers 112a-112c or the building management system 106 104 can configure the AHU controllers 112a-112c with at least one of the optimum combination of AHU flow rates.

The zone thermal unit 102, the zone temperature unit 102a, the zone humidity unit 102b, and the zone concentration unit 102c, and the building management system 106 comprises a memory (not shown in FIG. 1) to store sensory information, applications, instructions or the like for enabling to carry out various functions in accordance with various example embodiments and the like obtained from one or more sources (e.g., one or more sensors, and so on). Similarly, the zone thermal unit 102, the zone temperature unit 102a, the zone humidity unit 102b, and the zone concentration unit 102c, and the building management system 106 comprises a hardware processor (which may be optimizer 104 as shown in FIG. 1), such as, but are not limited to, one or more microprocessors, microcomputers, microcontrollers, digital signal processors, central processing units, state machines, logic circuitries, and/or any devices that manipulate signals based on operational instructions. Further, the hardware processor may comprise a multi-core architecture. Among other capabilities, the hardware processor is configured to fetch and execute computer-readable instructions or modules stored in the memory. The hardware processor 104 may include circuitry implementing, among others, audio and logic functions associated with the communication. For example, the hardware processor may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The hardware processor 104 thus may also include the functionality to encode messages and/or data or information. The hardware processor may include, among other things, a clock, an arithmetic logic unit (ALU) and logic gates configured to support operation of the hardware processor. Further, the hardware processor may include functionality to execute one or more software programs, which may be stored in the memory or otherwise accessible to the hardware processor. The zone thermal unit 102, the zone temperature unit 102a, the zone humidity unit 102b, and the zone concentration unit 102c, and the building management system 106 comprises an input/output (I/O) interface (not shown in FIG. 1) to enable communication across the zone thermal unit 102, the zone temperature unit 102a, the zone humidity unit 102b, and the zone concentration unit 102c, and the building management system 106 and perform one or more functionalities as described above. Similarly, the AHUs 110a-110c, the AHU controllers 112a-112c, and the hardware processor 104 may comprise similar components such as the memory, the hardware processor, and the input/output (I/O) interface (not shown in FIG. 1) to enable communication across the components of the system 100. The above components may be coupled using a system bus (not shown in FIG. 1) or similar mechanism.

A physical model based reactive control strategy that uses occupancy information to determine the optimum AHU fan speeds is described. In this embodiment, AHU fan speeds are collectively optimized to minimize the overall HVAC energy consumption without compromising on the thermal comfort requirements. The control strategy works in tandem with a fixed point iteration based approach to estimate the state of the thermally coupled zones. The optimizer described herein factors for intra-zone air mixing and achieves energy optimality through coordinated AHU control by exploiting the occupancy information. The said optimizer is a model based reactive HVAC control that exploits spatial variations in occupancy to minimize the HVAC energy while maintaining comfort. The control strategy works in tandem with a fixed point iteration based approach to estimate the state of the thermally coupled zones.

Occupancy and zone thermal property information is captured at granular level for optimum control of HVAC parameters. A physical model based reactive control strategy that uses occupancy information to determine the optimum AHU fan speeds is described.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A system for optimizing energy consumption in a plurality of air handling units, said system comprising:
a zone thermal unit that is configured to:
obtain a first set of input parameters specific to said plurality of air handling units (AHUs) in a zone, wherein said zone comprises a plurality of sub-zones capable of intra zone air mixing, said first set of input parameters comprising an internal heat gains, a surface convective loads, an intra-zone mixing, and a supply air temperature,
obtain a second set of input parameters specific to said plurality of air handling units (AHUs) in said zone, said second set of input parameters comprising an internal moisture gains, a supply humidity ratio of said plurality of air handling units,
obtain a third set of input parameters specific to said plurality of air handling units (AHUs) in said zone, said third set of input parameters comprising an air contaminant concentration and an ambient contaminant concentration of said plurality of air handling units, and
generate a first set of output parameters comprising a zone temperature, a humidity ratio and an air concentration at a first time interval; and
an optimizer that is configured to:
using a control strategy in tandem with a fixed point iteration based approach to estimate and maintain the state of the thermally coupled zones while generating a second set of output parameters comprising an optimum combination of AHU flow rates for said plurality of air handling units that yields thermal comfort and indoor air quality conditions in the zone, wherein the optimum combination of AHU flow rates are generated based on estimating a zone condition that results due to each of a AHU supply fan, a chiller performance curves and an overall energy consumption, as a outcome of using at least one of the first set of output parameters; and
set a coordinated combination of AHU fan speeds for each of the said plurality of AHUs, based on the second set of output parameters, to minimize the overall energy consumption while achieving the thermal comfort and indoor air quality conditions in the zone.

2. The system as claimed in claim 1, wherein said optimum combination of AHU flow rates for said plurality of air handling units is indicative of a vector of AHU supply mass flow rate.

3. The system as claimed in claim 1, wherein said zone thermal unit comprises a zone temperature unit that receives said first set of input parameters to generate said zone temperature.

4. The system as claimed in claim 1, wherein said zone thermal unit comprises a zone humidity unit that receives said second set of input parameters to generate said humidity ratio.

5. The system as claimed in claim 1, wherein said zone thermal unit comprises a zone concentration unit that receives said third set of input parameters to generate said air concentration.

6. The system as claimed in claim 1, wherein the first set of input parameters further comprises at least one of the AHU supply fan, the chiller performance curves and the overall energy consumption.

7. The system as claimed in claim 1, wherein said third set of parameters comprises at least one parameter from said first set of input parameters.

8. The system as claimed in claim 1, wherein each of said plurality of AHUs comprises an AHU controller that is configured with said optimum combination of AHU flow rates by at least one of said system and a building energy management system.

9. The system as claimed in claim 1, wherein said optimum combination of AHU flow rates comprises at least one of an optimal supply air mass flow rate and an optimal supply air temperature.

10. The system as claimed in claim 1, wherein said internal heat gains comprise at least one of an occupancy, lighting and electrical loads in said zone.

11. The system as claimed in claim 1, wherein said surface convective loads comprise at least one of a surface temperature and a geometric area of surfaces associated with said zone.

12. The system as claimed in claim 1, wherein said intra-zone mixing comprises at least one of temperature and humidity in a plurality of sub-zones in said zone.

13. The system as claimed in claim 1, wherein said internal moisture gains comprises occupancy information in said zone.

14. A method for optimizing energy consumption in a plurality of air handling units, said method comprising:
    obtaining using a zone thermal unit, a first set of input parameters specific to said plurality of air handling units (AHUs) in a zone, wherein said zone comprises a plurality of sub-zones capable of intra zone air mixing, said first set of input parameters comprising an internal heat gains, a surface convective loads, an intra-zone mixing, and a supply air temperature;
    obtaining using said zone thermal unit, a second set of input parameters specific to said plurality of air handling units (AHUs) in said zone, said second set of input parameters comprising an internal moisture gains, a supply humidity ratio of said plurality of air handling;
    obtaining using said zone thermal unit, a third set of input parameters specific to said plurality of air handling units (AHUs) in said zone, said third set of input parameters comprising an air contaminant concentration and an ambient contaminant concentration of said plurality of air handling units;
    generating using said zone thermal unit, a first set of output parameters comprising a zone temperature, a humidity ratio and an air concentration at a first time interval;
    using a control strategy in tandem with a fixed point iteration based approach to estimate and maintain the state of the thermally coupled zones while generating using an optimizer, a second set of output parameters comprising an optimum combination of AHU flow rates for said plurality of air handling units that yields thermal comfort and indoor air quality conditions in the zone, wherein the optimum combination of AHU flow rates are generated based on estimating a zone condition that results due to each of a AHU supply fan, a chiller performance curves and an overall energy consumption, as a outcome of using at least one of the first set of output parameters; and
    setting using the optimizer, a coordinated combination of AHU fan speeds for each of the said plurality of AHUs, based on the second set of output parameters, to minimize the overall energy consumption while achieving the thermal comfort and indoor air quality conditions in the zone.

15. The method as claimed in claim 14, wherein said zone thermal unit comprises a zone temperature unit that receives said first set of input parameters to generate said zone temperature.

16. The method as claimed in claim 14, wherein said zone thermal unit comprises a zone humidity unit that receives said second set of input parameters to generate said humidity ratio.

17. The method as claimed in claim 14, wherein said zone thermal unit comprises a zone concentration unit that receives said third set of input parameters to generate said air concentration.

18. A non-transitory computer-readable medium having embodied thereon a computer program for optimizing energy consumption in a plurality of air handling units, said non-transitory computer-readable medium comprising instructions for:
    obtaining using a zone thermal unit, a first set of input parameters specific to said plurality of air handling units (AHUs) in a zone, wherein said zone comprises a plurality of sub-zones capable of intra zone air mixing, said first set of input parameters comprising an internal heat gains, a surface convective loads, an intra-zone mixing, and a supply air temperature;
    obtaining using said zone thermal unit, a second set of input parameters specific to said plurality of air handling units (AHUs) in said zone, said second set of input parameters comprising an internal moisture gains, a supply humidity ratio of said plurality of air handling;
    obtaining using said zone thermal unit, a third set of input parameters specific to said plurality of air handling units (AHUs) in said zone, said third set of input parameters comprising an air contaminant concentration and an ambient contaminant concentration of said plurality of air handling units;
    generating using said zone thermal unit, a first set of output parameters comprising a zone temperature, a humidity ratio and an air concentration at a first time interval;
    using a control strategy in tandem with a fixed point iteration based approach to estimate and maintain the state of the thermally coupled zones while generating using an optimizer, a second set of output parameters comprising an optimum combination of AHU flow rates for said plurality of air handling units that yields thermal comfort and indoor air quality conditions in the zone, wherein the optimum combination of AHU flow rates are generated based on estimating a zone condition that results due to each of a AHU supply fan, a chiller performance curves and an overall energy consumption, as a outcome of using at least one of the first set of output parameters; and
    setting using the optimizer, a coordinated combination of AHU fan speeds for each of the said plurality of AHUs, based on the second set of output parameters, to minimize the overall energy consumption while achieving the thermal comfort and indoor air quality conditions in the zone.

19. The non-transitory computer-readable medium as claimed in claim 18, wherein said zone thermal unit comprises a zone temperature unit that receives said first set of input parameters to generate said zone temperature.

20. The non-transitory computer-readable medium as claimed in claim 18, wherein said zone thermal unit comprises a zone humidity unit that receives said second set of input parameters to generate said humidity ratio.

* * * * *